Jan. 19, 1943.  H. H. HASCHE  2,308,754
SPRING LEAF BEARING AND THE LIKE
Filed Oct. 28, 1940  2 Sheets-Sheet 1
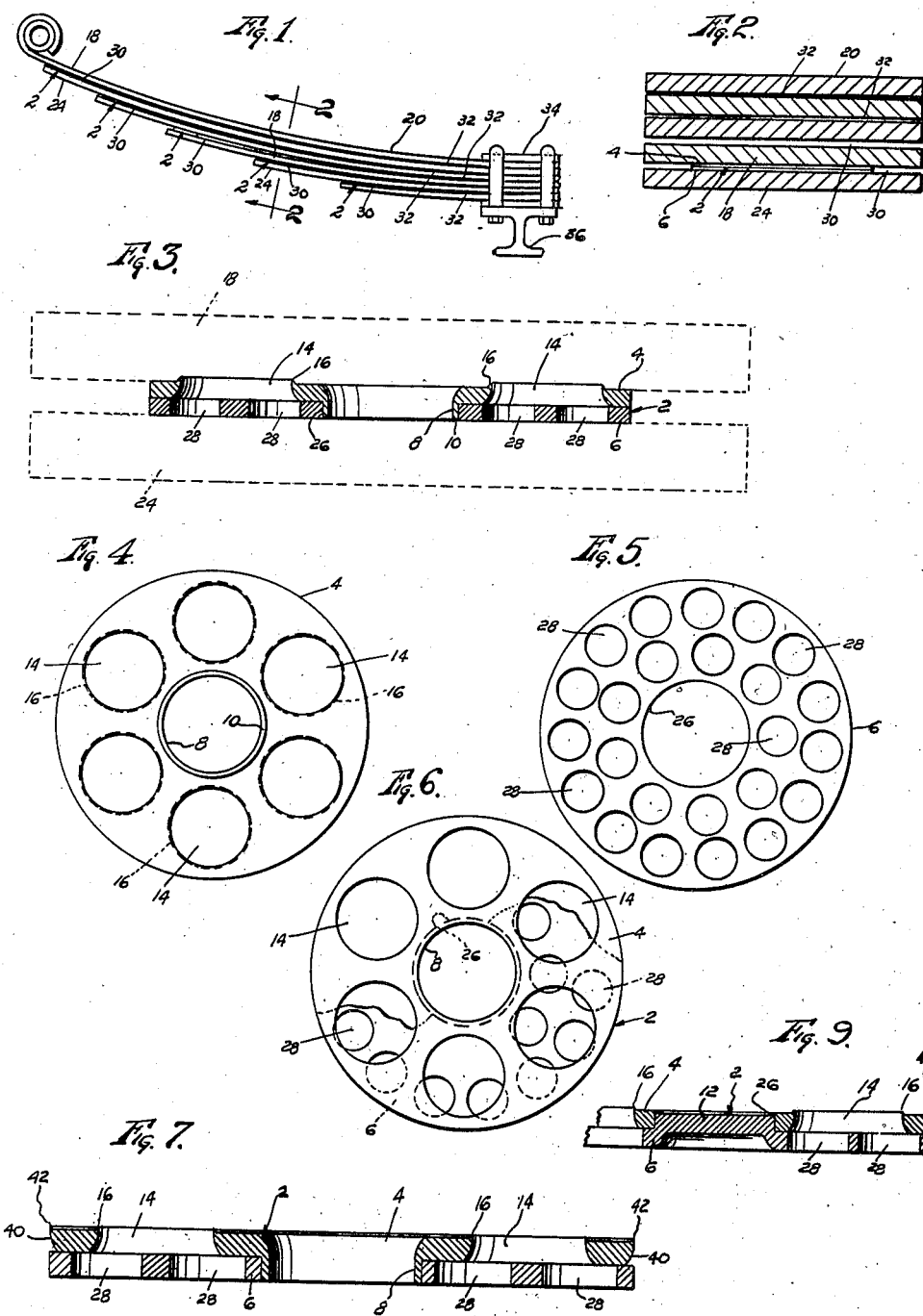

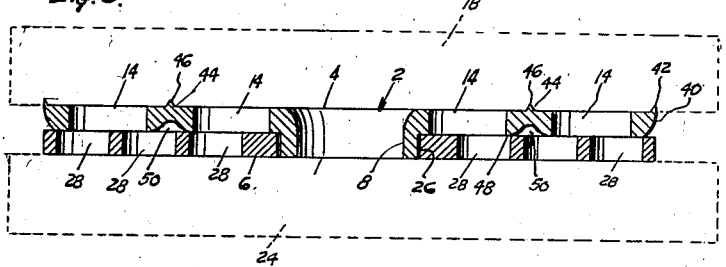
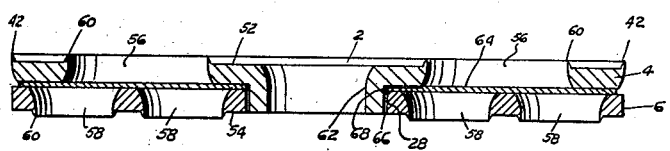
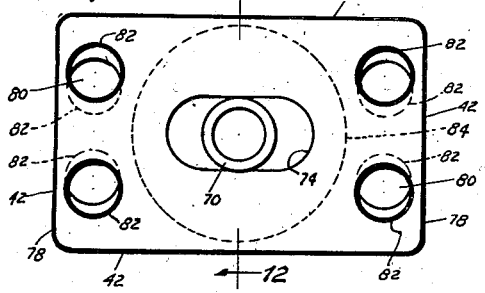
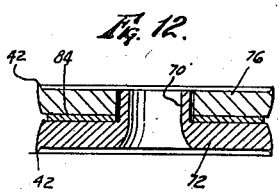
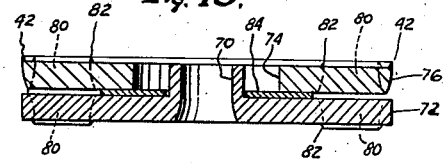
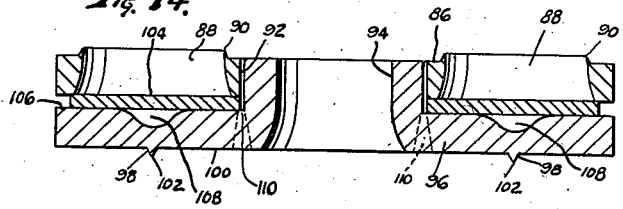

Patented Jan. 19, 1943

2,308,754

UNITED STATES PATENT OFFICE 2,308,754

SPRING LEAF BEARING AND THE LIKE

Herbert H. Hasche, Los Angeles, Calif.

Application October 28, 1940, Serial No. 363,080

12 Claims. (Cl. 267—50)

My invention relates to spring leaf bearing devices and among its more particular objects I aim to provide a bearing device for insertion between the leaves of leaf springs to reduce the frictional resistance to sliding movement of the spring leaves with respect to each other.

Another object is to provide a spring leaf bearing device comprised of a plurality of plates positioned one atop the other and in which at least one of the plates is movable with relation to the other or others.

Among the further more particular objects of my invention I aim to provide a bearing device which incorporates effective lubricant storing and distributing means; which provides novel means for interlocking the plates together in a manner to provide relative movement between them; which centralizes and distributes the load on the spring; which incorporates novel and effective means for securing the device to the spring leaf; which provides a lubricant path between adjacent spring leaves and which compensates for spring warps and high spots present in most conventional leaf springs.

How I attain these as well as further objects and advantages will appear from the specific adaptations thereof set forth in the annexed drawings and the following specification.

Referring now to the drawings:

Fig. 1 is a fragmentary side elevational view of a conventional vehicle spring having my novel form of bearing disposed between the leaves of said spring;

Fig. 2 is an enlarged cross-sectional view taken on line 2—2 of Fig. 1 and showing the relative position of the bearing member between the spring leaves;

Fig. 3 is an enlarged cross-sectional view of the bearing in the position shown in Fig. 2, showing the anchor ridges embedded in the spring leaf;

Fig. 4 is a plan view of the top plate;

Fig. 5 is a plan view of the bottom plate;

Fig. 6 is a plan view of the bearing plates disposed one over the other, showing relative positions of the perforations and the lubricant passage;

Fig. 7 is an enlarged cross-sectional view showing a variational form;

Fig. 8 is an enlarged cross-sectional view showing another variational form;

Fig. 9 is a fragmentary enlarged cross-sectional view showing another variational form;

Fig. 10 is an enlarged cross-sectional view showing another variational form;

Fig. 11 is a plan view showing another variational form;

Fig. 12 is a cross-sectional view taken on line 12—12 of Fig. 11;

Fig. 13 is a cross-sectional view showing the device of Fig. 11; and

Fig. 14 is an enlarged cross-sectional view showing another form of device, similar to that of Figs. 11, 12 and 13 but showing further modifications.

In general, my bearing device includes a top anchor plate 4 and a bottom bearing plate 6, said plates being positioned on atop the other. Anchor plate 4 presents a center bearing collar 8 which is formed in the center and made an integral part of said plate 4, having its rim edge 10 only a distance which is commensurate with the thickness of the plate 6 when same are placed together, and which, in combination and in preferred form, will not exceed .052 of an inch in thickness for providing the best results.

Collar 8 need not be rim shaped, as shown in Fig. 3, but it may be made solid and may be pressed out of the anchor plate 4, which will provide sufficient bearing plug 12 as shown in Fig. 9, about which said bottom bearing plate 6 may turn.

Anchor plate 4 is also provided with a plurality of lubricant reservoirs 14, each of which is provided with an anchor ridge 16 adapted for anchoring said plate 4 upon the surface of the adjacent upper spring leaf 18 of the vehicle spring section 20 over and near the tip end of the spring leaf 24 positioned thereunder.

The bottom bearing plate 6 is provided with a center bearing hole 26 adapted for engaging said bearing collar 8 of the anchor plate 4 and is also provided with a plurality of perforations 28 which, in size, are considerably smaller as compared to the reservoirs 14 and, in number, are greater for uncovering, closing and exposing the lubricant passages so produced when said plate 6 rotates about said bearing collar 8. Such rotation provides a valve action for the lubricant.

It may be noted that when said bearing plates 2 are placed between the spring leaves 18 and 24 a crevice or space 30 is provided therebetween which diminishes in size and in proportion, as at 32, as the same reaches the axle plate 34, which latter is adapted to hold said vehicle spring section 20 to the axle member 36.

When said bearing plates 2 are placed between said spring leaves the anchor ridges 16 of the upper plate 4 become embedded in the spring surface, by reason of being made out of relatively harder material, while the bottom bearing plate 6 is held freely thereunder, being held in place by means of said bearing collar 8, so that the most prominent edge, surface or portion of the spring leaf tip will bear thereagainst, causing said bottom plate 6 to rotate about its center during the flexation of said springs 18 and 24 and thereby causing the lubricant placed in said reservoirs 14 to pass downwardly and through the perforations 28 when same are suitably positioned.

In this manner, said bearing plates 2 provide means to prevent spring friction at the ends or the tips thereof and in addition said lubricant is permitted to pass between said springs into the crevice or passages 30 and 32, consequently preventing squeaks and surface friction of said spring leaves.

In Fig. 7, the bearing plates 2 comprise an anchor plate 4, which, similarly as shown in Fig. 3, is provided with a suitable bearing collar 8 about which the bottom bearing plate 6 revolves, when in position and when actuated by the action of the spring leaves 18 and 24.

Said anchor plate 4 is provided with lubricant reservoir holes 14, each having an annular anchor ridge 16 adapted for anchoring said plate upon the surface of the spring leaf disposed thereabove, also having its outside rim 40 provided with an anchoring ridge 42 for supporting the position of said plate 2 when said bearing is subjected to severe shock because of an exceptionally rapid flexation of the springs, or, when the spring leaves are of light and hard material and subjected to an overload, while the bearing 6 is provided with passages 28 for lubricating the spring surfaces, when in use.

In Fig. 8, said bearing plates 2 are composed of a pair of plates, each of which, as hereinbefore described, is preferably circular in shape, having the anchor plate 4 provided with a suitable annular anchoring ridge 42 at the outside rim section 40. This form of device also has the lubricant reservoir holes 14, the centrally disposed collar 8, which is adapted for engaging the center bearing hole 26, and lubricant passages 28 for permitting the lubricant to pass therethrough.

Said anchor plate 4, in addition to having said annular anchoring ridge 42, is provided with conical projections 44 having tips 46 sharp at the point and extending in the same direction as the sharp edge of the ridge 42, said projections being provided to engage the spring leaf when pressed thereagainst in use, to support said plate 4 in place, while the underside 48 opposite projections 44 is provided with cavities 50, which are for storing therein additional lubricating material and thereby providing means for additionally supplying said lubricant into said spring leaves and for lubricating the contact surfaces of said plates 4 and 6.

In the form of Fig. 10 a limited relative movement as between the plates is provided for. There bearing plates 2 are composed of the top and bottom plates 52 and 54, respectively, each having lubricant containing perforations 56 and 58, respectively, provided with annular anchor ridges 60. The center collar 62 extends downwardly into the center hole of the bottom plate 54. A spacer plate 64 is placed between plates 52 and 54. The extent of relative movement of bearing plates 52 and 54, with respect to each other, is controlled by the extent of clearance 66 between the collar 62 and the side wall of the center hole into which collar 62 projects. Plates 52 and 54 are secured to the spring by means of the anchor ridges 60. The lubricant disposed in the perforations 56 and 58 lubricates the separator plate 64 and also passes through the clearance 66 provided between the collar 62 and the side wall of the center hole into which collar 62 projects.

In Figs. 11, 12 and 13, said spring leaf bearing plates 2 are of different shape, being rectangular in shape and having the plate bearing collar 70 extending upwardly from the bottom plate 72 into the slot 74 of the upper plate 76, each of said plates having their end portions 78 provided with perforations 80, each having an annular anchor ridge 82 provided therein as shown in Fig. 13. Said perforations 80 may be staggered for insuring the hold of the annular ridges 82 when in place. Plates 2 have therebetween a separator plate 84 which may be round, as shown, and thereby allowing sufficient clearance to rotate said plates about the bearing collar 70 and for sliding or oscillating same along the slot 74 during the flexation of said spring leaves.

In Fig. 14, the bearing plates 2 comprise a top reservoir plate 86 having the perforations 88 provided with annular anchor ridges 90 for anchoring said plate in the spring leaf 12 also having a plate bearing hole 92 for receiving the collar 94 of the bottom plate 96. Bottom plate 96 is provided with suitable conical projections 98 provided on the plate surface 100 with a sharp point 102 for engaging the spring surface of the spring member 24. Between said plates there is a separator plate 104 which is free to rotate between the top and bottom plates as spring flexure and longitudinal spring leaf movement causes sliding movement of either the top or bottom plate with respect to each other.

The top face 106 of bottom plate 96, opposite projections 98, is provided with indentations providing reservoirs 108 for lubricant, the lubricant passing therefrom to lubricate the bearing member and also the space provided by the separator 104 and pass through the holes 110 in the bottom plate 96.

While I have thus described my invention with great particularity, it will be clear that the same may be modified throughout a wide range. I accordingly do not propose to be limited to the exact details of construction herein shown on the drawings and described in the specification, but reserve the right in practice to make the necessary changes and modifications therein, which may come within the scope of the appended claims.

I claim as my invention:

1. A bearing device of the class described for mounting between adjacent leaves of a leaf spring comprising a pair of perforated plates disposed in parallel relationship one atop the other, one of said plates being rotatable with respect to the other.

2. The device of claim 1 in which one of said plates has a relatively greater ratio of perforated to unperforated area than the other.

3. The device of claim 1 in which the perforations in the lowermost of said plates are relatively smaller than and more widely distributed than the perforations in the topmost plate.

4. A bearing device of the class described for mounting between adjacent leaves of a leaf spring comprising a pair of discs disposed in parallel relationship one atop the other, one of said plates being centrally journalled on the other for rotation with respect thereto.

5. A bearing device of the class described for mounting between adjacent leaves of a leaf spring comprising a pair of round discs disposed in parallel relationship one atop the other, a round perforation centrally through each of said discs and an annular flange around one of said perforations, said flange projecting into the said central perforation in the other disc to provide a bearing for rotation thereof.

6. A bearing device of the class described for mounting between adjacent leaves of a leaf spring comprising a perforated top plate, a bearing portion carried by said top plate and projecting therebelow, and a perforated bottom plate rotatably mounted on said bearing portion.

7. In combination with a vehicle leaf spring having a plurality of leaves, a bearing device mounted between adjacent leaves, comprising: a pair of flat plates disposed one atop the other, the topmost of said plates being provided with a central opening and a plurality of perforations spaced apart around said opening, the lower of said plates having a central opening, and a plurality of perforations widely distributed around said central opening, said last named perforations being smaller in diameter and relatively more numerous than the perforations in the other plate, means rotatably securing one of said plates to the other and projections on said other plate for securing it to the adjacent spring leaf.

8. In combination with a vehicle leaf spring having a plurality of leaves, a bearing device mounted between adjacent leaves, comprising: a pair of flat plates disposed one atop the other, the topmost of said plates being provided with a central opening and a plurality of perforations spaced apart around said opening, the lower of said plates having a central opening, and a plurality of perforations widely distributed around said central opening, means rotatably securing the lower of said plates to the topmost plate, including a bearing member carried by the topmost plate and projecting into the central opening of the lower plate, and projections on the topmost plate for securing it to the adjacent spring leaf.

9. In combination with a vehicle leaf spring having a plurality of leaves, a bearing device mounted between adjacent leaves, comprising: a pair of flat plates disposed one atop the other, the topmost of said plates being provided with a central opening and a plurality of perforations spaced apart around said opening, the lower of said plates having a central opening, and a plurality of perforations widely distributed around said central opening, the ratio of perforated to unperforated area being relatively greater in the lower plate than in the topmost plate, means rotatably securing the lower plate to the topmost plate, including an annular flange around the central opening of the topmost plate, said flange projecting into the central opening of the lower plate, and means for securing the topmost plate to the adjacent spring leaf.

10. In combination with a vehicle leaf spring having a plurality of leaves, a bearing device mounted between adjacent leaves, comprising: a pair of flat plates disposed one atop the other, the topmost of said plates being provided with a central opening and a plurality of perforations spaced apart around said opening, the lower of said plates having a central opening, and a plurality of perforations around said central opening, means rotatably securing said lower plate to the topmost plate, and annular flange portions around some of the perforations in the topmost plate for engaging the adjacent spring leaf whereby to non-rotatably secure said plate to said spring leaf.

11. In combination with a vehicle leaf spring having a plurality of leaves, a bearing device mounted between adjacent leaves, comprising: a pair of flat discs disposed one atop the other, the topmost of said discs having a central opening surrounded by a plurality of circumferentially spaced perforations, the lower disc having a central opening surrounded by concentric rows of circumferentially spaced perforations, and the central opening in the topmost disc carrying a bearing member projecting into the central opening of the lower disc whereby to provide a bearing for rotation of the lower disc with respect to the topmost disc.

12. A bearing device for mounting between adjacent leaves of a leaf spring comprising a pair of circular discs disposed in face to face contact between adjacent leaves, means stationarily securing the first of said discs to one of said leaves and the second disc being rotatably connected to the first disc, the contacting faces of said discs being plane throughout their peripheral portions whereby to permit free rotation of the second disc with respect to the first disc.

HERBERT H. HASCHE.